United States Patent Office 3,347,742
Patented Oct. 17, 1967

3,347,742
2 - (4 - CYCLOHEXYLCYCLOHEXYL) - 3 - HYDROXY - 1,4 - NAPHTHOQUINONE IN CONTROLLING COCCIDIOSIS IN POULTRY
Edward F. Rogers, Middletown, N.J., assignor to Merck & Co., Inc., Rahway, N.J., a corporation of New Jersey
No Drawing. Filed May 28, 1965, Ser. No. 459,929
3 Claims. (Cl. 167—53.2)

This invention relates to novel compositions for the treatment of the poultry disease coccidiosis. More specifically, it is concerned with animal feeds and feed supplements containing as an active anti-coccidial agent 2-(4-cyclohexylcyclohexyl) - 3-hydroxy - 1,4-naphthoquinone.

Coccidiosis is a common and widespread poultry disease caused by species of protozoan parasites of the genus Eimeria. The most important of these species are *E. maxima, E. acervulina, E. tenella, E. necatrix, E. brunetti, E. praecox* and *E. mitis*. In turkeys, *E. meleagridis* and *E. adenoides* are also causative organisms of coccidiosis. When left untreated, the disease leads to poor weight gain, reduced feed efficiency and high mortality. For these reasons, the control of coccidiosis is highly important to the poultry industry. Although *E. tenella* and *E. necatrix* cause the most lethal forms of the disease, it has recently been realized that infections due to other species, and particularly to the so-called intestinal species such as *E. acervulina, E. brunetti* and *E. maxima*, also present a serious economic problem.

It is an object of this invention to provide a new and novel method of combatting coccidiosis. It is a further object to provide novel anticoccidial compositions. A more specific object is provision of animal feeds and feed additives containing the anticoccidial agent described herein.

In accordance with the present invention it has now been found that 2-(4-cyclohexylcyclohexyl)-3-hydroxy-1,4-naphthoquinone of the formula

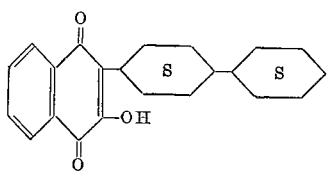

is active against coccidiosis and is useful in the prevention and treatment of this parasitic infestation when administered in minor amounts to animals susceptible to coccidiosis.

The naphthoquinone of the above general structural formula may exist in either of two stereospecific forms, namely, the cis and trans forms. Either of these forms, or mixtures thereof, is contemplated in the methods and compositions of the present invention. The trans form is considerably more active against coccidiosis than the cis, and for this reason the use of 2-(4-trans cyclohexylcyclohexyl)-3-hydroxy-,4-naphthoquinone in treating coccidiosis and anti-coccidial compositions containing such stereoisomer constitute a preferred embodiment of the invention.

2-(4-cyclohexylcyclohexyl) - 3-hydroxyl-1,4 - naphthoquinone is used to treat and/or prevent coccidiosis by administering it orally to poultry. It may be given in the feedstuff of the birds, in the drinking water, or if desired by direct administration dissolved or suspended in a suitable solvent. In any case, only minor amounts are required in order to obtain the desired anticoccidial result.

It is preferred to disperse the naphthoquinone compound in the finished feed of the animals, and to administer the medicated feed ad libitum to the birds. Good anticoccidial effect is achieved with feedstuffs containing from about 0.003% to 0.05% by weight of 2-(4-cyclohexylcyclohexyl) - 3-hydroxy-1,4-naphthoquinone with feed concentration levels of about 0.005% to 0.03% by weight being preferred, especially with 2-(4-trans-cyclohexylcyclohexyl) - 3-hydroxy-1,4-naphthoquinone. Higher levels of up to about 0.15% by weight can be used, but are employed primarily for therapeutic use to treat an established infection, when the drug is administered only for relatively short periods of time. It might be mentioned here that dose levels of poultry coccidiostats are expressed in the art in terms of percent concentration of drug in the feed or drinking water because the exact amount of feed or water consumed by an individual bird is not measured as a matter of general practice.

The feedstuff compositions referred to above are those normally used in the poultry-raising industry. They may be so-called mashes containing ground grain, protein, and mineral and vitamin concentrates. Alternatively, they may consist of broiler feeds made up primarily of corn together with proteins and growth factors. In any event, the feedstuffs supplemented with the coccidiostats of this invention are nutritionally adequate ones for the poultry.

As previously mentioned, the 2-(4-cyclohexylcyclohexyl)-3-hydroxy-1,4-naphthoquinone may also be administered to poultry by way of the drinking water of the birds. When this route is used for prevention of coccidosis, the treatment levels in the water are generally about one-half of those that would be used in a solid feedstuff since the birds drink about twice as much as they eat. This method of treatment is advantageously employed in the therapeutic use of the compounds since poultry infected with coccidiosis consume less solid feed than normal healthy birds. The compounds may be added directly to the drinking water or, alternatively, water-soluble powders may be prepared, in which the coccidiostat is intimately admixed with a suitable carrier, such as dextrose or sucrose, and these powders added to the drinking water of poultry as necessary. Such water-soluble powders may contain any desired concentration of coccidiostat, and preparations containing from about 0.1–20% by weight of active compound are suitable.

Compositions which are one of the preferred features of the invention are feed supplements or pre-mixes in which the 2 - (4 - cyclohexylcyclohexyl) - 3-hyroxy-1,4-naphthoquinone compound is present in relatively large amounts in a poultry feed additive. The carrier vehicle or diluent for such feed supplements should be essentially non-reactive with the anticoccidial agent, safely administrable to poultry, and one that is or may be a normal ingredient of the finished feed. Diluents which are normally employed are solid orally ingestible poultry feed additives such as distillers' dried grains, corn meal, citrus meal, fermentation residues, wheat middlings, corn gluten feed, ground oyster shells, Attapulgus clay, wheat shorts, molasses solubles, corn cob meal, edible vegetable substances, toasted dehulled soya flour, soybean mill feed, antibiotic mycelia, soya grits and the like. For the compositions of this invention, nutritive carriers are preferred. These supplements are incorporated in the poultry feed either directly or after an intermediate dilution or blending step.

The anticoccidial compounds described herein are intimately dispersed or blended throughout the solid orally-ingestible carrier by methods such as grinding, stirring, milling or tumbling. It is normally dispersed or mixed uniformly in the diluent but in some instances may be sorbed on the carrier. The desired concentration of coccidiostat is achieved by selecting proper diluents and by altering the ratio of carrier to active ingredient. Animal feed supplement formulations containing from about 10% to about 40% by weight, and preferably from about 15–30% by weight, of naphthoquinone are particularly suitable for addition to poultry feeds, and are a preferred part of the invention. The optimal concentration of coccidiostat in these feed supplements will depend to some extent on the particular compound employed. Since it is convenient for the feed manufacturer to use about 1–5 pounds of feed supplement for each ton of finished feed, the preferred concentration of any one of these coccidiostats in the supplement is also to a large extent a function of the desired level of active ingredient in the finished feed.

These feed supplements are usually further diluted with feed ingredients such as corn meal or soybean meal before being incorporated in the animal feed. In this intermediate processing step the level of coccidiostat is reduced, thus facilitating uniform distribution of the substance in the finished feed which is a nutritionally adequate one normally containing a source of fat, protein, carbohydrate, minerals, vitamins and other nutritional factors.

An additional aspect of this invention comprises anticoccidial compositions of the type described hereinabove which contain one or more other coccidiostats in addition to 2-(4-cyclohexylcyclohexyl)-3-hydroxy-1,4-naphthoquinone. Such compositions may be used when it is desired to broaden the spectrum of compositions containing only the naphthoquinone, or to improve potency against a particular strain of coccidia. Among the coccidiostats heretofore developed and which may be added to compositions containing 2-(4-cyclohexylcyclohexyl)-3-hydroxy-1,4-naphthoquinone there may be mentioned 2-methyl-3,5-dinitrobenzimide, nicarbazin, glycarbylamide, 3,5 - dinitrobenzamide, methiotriazonine-bithionol mixtures, 1 - (2-loweralkyl-4-amino-5-pyrimidinylmethyl)-2-methyl pyridinium quaternary salts and 1-(2-loweralkyl-4-amino-5-pyrimidinylmethyl)-4-methyl pyridinium quaternary salts such as 1-(2-n-propyl-4-amino-5-pyrididinylmethyl) - 2 - methyl pyridinium chloride hydrochloride (amprolium), and 1-(2-n-propyl-4-amino-5-pyrimidinylmethyl)-4-methyl pyridinium chloride hydrochloride and methyl-2-ethoxy-4-acetamido benzoate. All or any of these as well as others not given in this representative listing may be mixed with the naphthoquinones described herein to give highly potent coccidiostat compositions which in some instances may exhibit potency greater than would be expected from the mere additive effects of the drugs.

The birds, in groups of three each, are weighed and placed in cages with wire floors. They are fed ad libitum a standard laboratory ration in which graded concentrations of test compounds are blended just prior to use. Normal and infected control birds are fed basal ration containing no test compound. On the second day of the test the chicks are inoculated orally with sporulated oocysts of a selected species of coccidia. On the sixth day after inoculation all surviving birds are sacrificed and weighed. Feces are collected from the preceding 24 hours, and their oocyst content determined.

The anticoccidial activity of 2-(4-cyclohexylcyclohexyl)-3-hydroxy-1,4-naphthoquinone against different species of coccidia is determined using straight run White Leghorn chicks.

In experiments conducted in this manner the mixture of cis and trans 2-(4-cyclohexylcyclohexyl)-3-hydroxy-1,4-naphthoquinone is active against the *E. brunetti* species of coccidia when administered at a feed level of 0.025% by weight; 2-(4-cis-cyclohexylcyclohexyl)-3-hydroxy-1,4-naphthoquinone is active against *E. brunetti* at a feed level of 0.0125% by weight and moderately active at a level of 0.006% by weight; 2-(4-trans-cyclohexylcyclohexyl)-3-hydroxy-1,4-naphthoquinone is active against *E. brunetti* at a feed level of 0.006% by weight, against *E. tenella* at 0.0125% by weight and against *E. maxima* at a level of 0.0125% by weight.

What is claimed is:

1. The method of controlling coccidiosis in poultry that comprises orally administering to poultry an anticoccidially-effective amount of 2-(4-cyclohexylcyclohexyl)-3-hydroxy-1,4-naphthoquinone.

2. The method of controlling coccidiosis in poultry that comprises orally administering to poultry an anticoccidially-effective amount of 2-(4-trans-cyclohexylcyclohexyl)-3-hydroxy-1,4-naphthoquinone.

3. The method of controlling coccidiosis in poultry that comprises orally administering to poultry a feedstuff containing an anticoccidially-effective amount of 2-(4-trans-cyclohexylcyclohexyl)-3-hydroxy-1,4-naphthoquinone.

References Cited

UNITED STATES PATENTS

| | | | |
|---|---|---|---|
| 2,510,487 | 6/1950 | Waletzsky | 167—53.1 |
| 2,553,648 | 6/1951 | Fieser | 167—53.1 |

OTHER REFERENCES

Chem. Abs., vol. 43, pp. 1109(c), and 1371(a), 1949.

Dorland. The American Illustrated Med. Dictionary, 17th ed. (1938), page 330.

Hagen and Bruner: The Infectious Diseases of Domestic Animals, 4th ed., 1961, Comstock Publishing Assoc., Ithaca, N.Y. (p. 606, relied on).

The Yearbook of Agriculture, Animal Diseases (1956), page 437.

Veter. Bulletin, vol. 16 (1946), pages 5–6.

ALBERT T. MEYERS, *Primary Examiner.*

JULIAN S. LEVITT, SAM ROSEN, *Examiners.*

N. G. MANN, S. J. FRIEDMAN, *Assistant Examiners.*